US012626122B2

(12) United States Patent
Khaleghi et al.

(10) Patent No.: US 12,626,122 B2
(45) Date of Patent: May 12, 2026

(54) METHODS OF PROVIDING TRAINED HYPERDIMENSIONAL MACHINE LEARNING MODELS HAVING CLASSES WITH REDUCED ELEMENTS AND RELATED COMPUTING SYSTEMS

(71) Applicant: The Regents of the University of California, Oakland, CA (US)

(72) Inventors: Behnam Khaleghi, La Jolla, CA (US); Tajana Simunic Rosing, San Diego, CA (US); Mohsen Imani, San Diego, CA (US); Sahand Salamat, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1436 days.

(21) Appl. No.: 17/224,306

(22) Filed: Apr. 7, 2021

(65) Prior Publication Data

US 2021/0326756 A1      Oct. 21, 2021

Related U.S. Application Data

(60) Provisional application No. 63/006,419, filed on Apr. 7, 2020.

(51) Int. Cl.
| | |
|---|---|
| *G06N 3/08* | (2023.01) |
| *G06F 18/214* | (2023.01) |
| *G06F 18/2431* | (2023.01) |
| *G06N 20/00* | (2019.01) |
| *G06V 10/77* | (2022.01) |

(52) U.S. Cl.
CPC ............. *G06N 3/08* (2013.01); *G06F 18/214* (2023.01); *G06F 18/2431* (2023.01); *G06N 20/00* (2019.01); *G06V 10/7715* (2022.01)

(58) Field of Classification Search
CPC ...... G06N 3/08; G06N 20/00; G06V 10/7715; G06F 18/214; G06F 18/2431
See application file for complete search history.

(56) References Cited

U.S. PATENT DOCUMENTS

| | | | | |
|---|---|---|---|---|
| 2019/0347125 A1* | 11/2019 | Sankaran | .............. | G06F 9/3842 |
| 2020/0090045 A1* | 3/2020 | Baker | .................... | G06N 3/045 |

(Continued)

OTHER PUBLICATIONS

Kontostathis et al., "Identification of Critical Values in Latent Semantic Indexing," Studies in Computational Intelligence (SCI) 6, 333-346 (2005) (Year: 2005).*

(Continued)

*Primary Examiner* — Miranda M Huang
*Assistant Examiner* — Yao David Huang
(74) *Attorney, Agent, or Firm* — Stanek Lemon Crouse & Meeks, PA

(57) ABSTRACT

A method of providing a trained machine learning model can include providing a trained non-binary hyperdimensional machine learning model that includes a plurality of trained hypervector classes, wherein each of the trained hypervector classes includes N elements, and then, eliminating selected ones of the N elements from the trained non-binary hyperdimensional machine learning model based on whether the selected element has a similarity with other ones of the N elements, to provide a sparsified trained non-binary hyperdimensional machine learning model.

13 Claims, 12 Drawing Sheets

(56) References Cited

U.S. PATENT DOCUMENTS

| | | | |
|---|---|---|---|
| 2020/0228137 A1* | 7/2020 | Chinya | H03M 7/3059 |
| 2020/0379673 A1* | 12/2020 | Le Gallo-Bourdeau | |
| | | | G06G 7/22 |

OTHER PUBLICATIONS

Imani et al., "VoiceHD: Hyperdimensional Computing for Efficient Speech Recognition," 2017 IEEE International Conference on Rebooting Computing (ICRC), Washington, DC, USA, 2017, pp. 1-8 (Year: 2017).*

Imani et al, "Hierarchical Hyperdimensional Computing for Energy Efficient Classification," DAC '18, Jun. 24-29, 2018, San Francisco, CA, USA (Year: 2018).*

Lu et al., "SpWA: An Efficient Sparse Winograd Convolutional Neural Networks Accelerator on FPGAs," DAC '18, Jun. 24-29, 2018 , San Francisco, CA, USA (Year: 2018).*

Imani et al., "SparseHD: Algorithm-Hardware Co-optimization for Efficient High-Dimensional Computing," IEEE International Symposium on Field-Programmable Custom Computing Machines (FCCM), Accepted Manuscript 1.0 (9 pages, pub. Apr. 1, 2019), retrieved from <https://par.nsf.gov/biblio/10100934> (Year: 2019).*

Scikit-learn Developers, "scikit-learn user guide: Release 0.21.3," Jul. 29, 2019, pp. 314-318 and 1791-1794. Retrieved from <https://scikit-learn.org/0.21//_downloads/scikit-learn-docs.pdf> (Year: 2019).*

Imani et al., "A Binary Learning Framework for Hyperdimensional Computing," 2019 Design, Automation & Test in Europe Conference & Exhibition (DATE), Florence, Italy, Mar. 25-29, 2019, pp. 126-131 (Year: 2019).*

Houle et al., "Improving the quality of K-NN graphs through vector sparsification: application to image databases," Int J Multimed Info Retr (2014) 3:259-274 (Year: 2019).*

Imani et al., "SparseHD: Algorithm-Hardware Co-optimization for Efficient High-Dimensional Computing," FCCM 2019, San Diego, CA, USA, 2019, pp. 190-19, IEEE Xplore, retrieved from <https://ieeexplore.ieee.org/document/8735551> (Year: 2019).*

Bibliographic information for Imani et al., "SparseHD: Algorithm-Hardware Co-optimization for Efficient High-Dimensional Computing." Retrieved from <https://par.nsf.gov/biblio/10100934-sparsehd-algorithm-hardware-co-optimization-efficient-high-dimensional-computing> on Apr. 7, 2025 (Year: 2025).*

Shahnaz et al., "Review of Storage Techniques for Sparse Matrices," 2005 Pakistan Section Multitopic Conference, Karachi, Pakistan, 2005, pp. 1-7 (Year: 2005).*

Rahimi et al., "High-Dimensional Computing as a Nanoscalable Paradigm," in IEEE Transactions on Circuits and Systems I: Regular Papers, vol. 64, No. 9, pp. 2508-2521, Sep. 2017 (Year: 2017).*

Imani et al.m "SparseHD: Algorithm-Hardware Co-optimization for Efficient High-Dimensional Computing," 2019 IEEE 27th Annual International Symposium on Field-Programmable Custom Computing Machines (FCCM), San Diego, CA, USA, 2019, pp. 190-198 (Year: 2019).*

M. Imani, et al. "Exploring hyperdimensional associative memory," High Performance Computer Architecture (HPCA), 2017 IEEE International Symposium. IEEE, 2017.

T. Wu, et al., "Brain-inspired computing exploiting carbon nanotube fets and resistive ram: Hyperdimensional computing case study," IEEE Intl. Solid-State Circuits Conference (ISSCC). IEEE, 2018.

H. Li, et al., "Hyperdimensional computing with 3d vrram in-memory kernels: Device-architecture co-design for energy-efficient, error-resilient language recognition," Electron Devices Meeting (IEDM), 2016 IEEE International. IEEE, 2016.

M. Laiho, et al., "High-dimensional computing with sparse vectors," Biomedical Circuits and Systems Conference (BioCAS), IEEE, 2015.

M. Imani, et al., "Low-power sparse hyperdimensional encoder for language recognition," IEEE Design & Test, vol. 34, 2017.

* cited by examiner

Table 1: Classification accuracy and efficiency of HD using binarized and non-binarized model.

| Applications | n | N | Non-binarized | | Binarized | |
|---|---|---|---|---|---|---|
| | | | Accuracy | Exe (ms) | Accuracy | Exe (ms) |
| Language Recognition | NA | 21 | 96.7% | 7.1 | 96.1% | 1.3 |
| EMG Gesture Detection | NA | 5 | 97.8% | 3.2 | 83.7% | 0.5 |
| Speech Recognition | 617 | 26 | 95.5% | 11.8 | 88.1% | 1.6 |
| Activity Recognition | 561 | 6 | 94.6% | 3.6 | 77.4% | 0.6 |
| Physical Monitoring | 52 | 12 | 94.5% | 8.0 | 85.7% | 1.1 |
| Face Detection | 608 | 2 | 96.9% | 4.7 | 38.9% | 0.7 |

FIG. 4

(a) Dimension-wise Sparsity

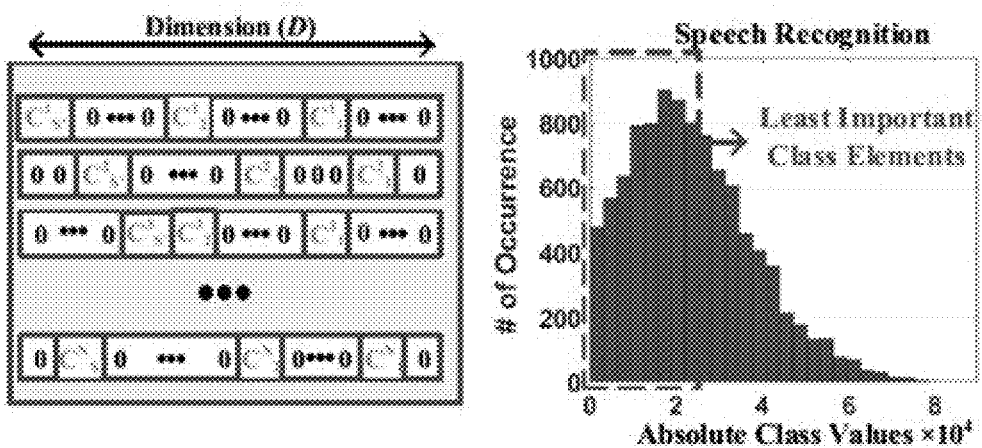
(b) Class-wise Sparsity
FIG. 7
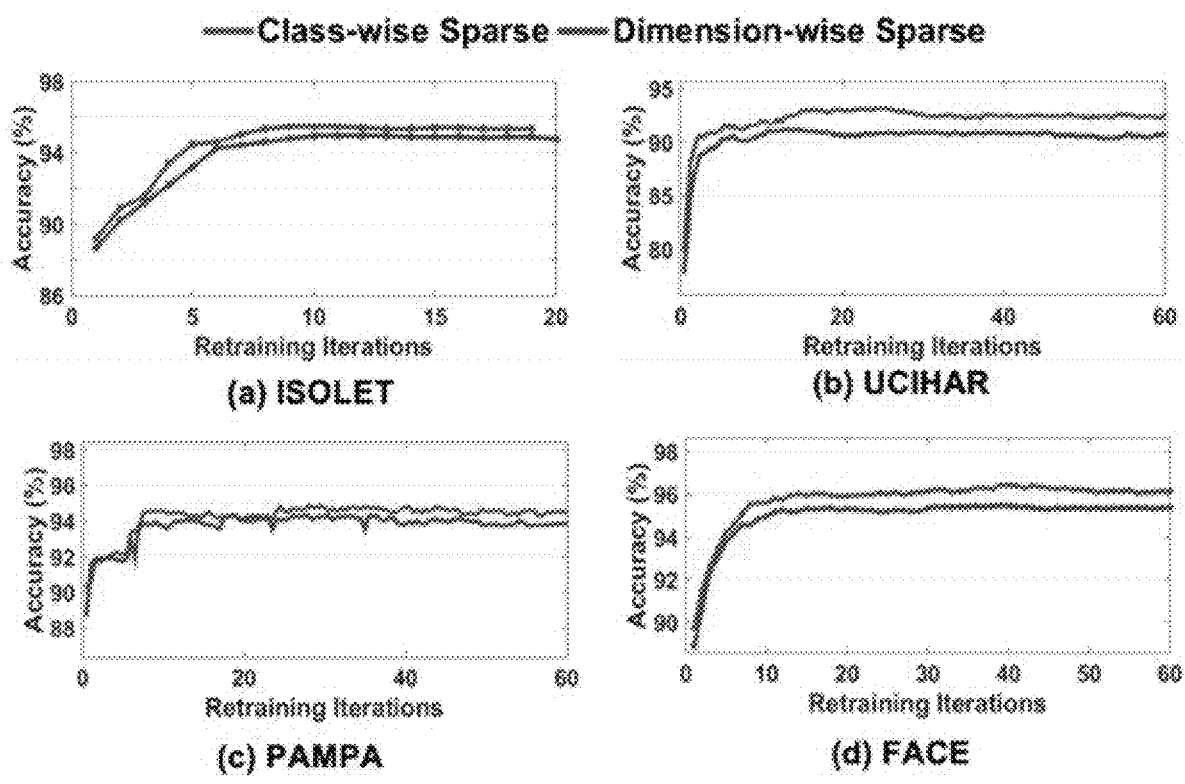
FIG. 8a-d

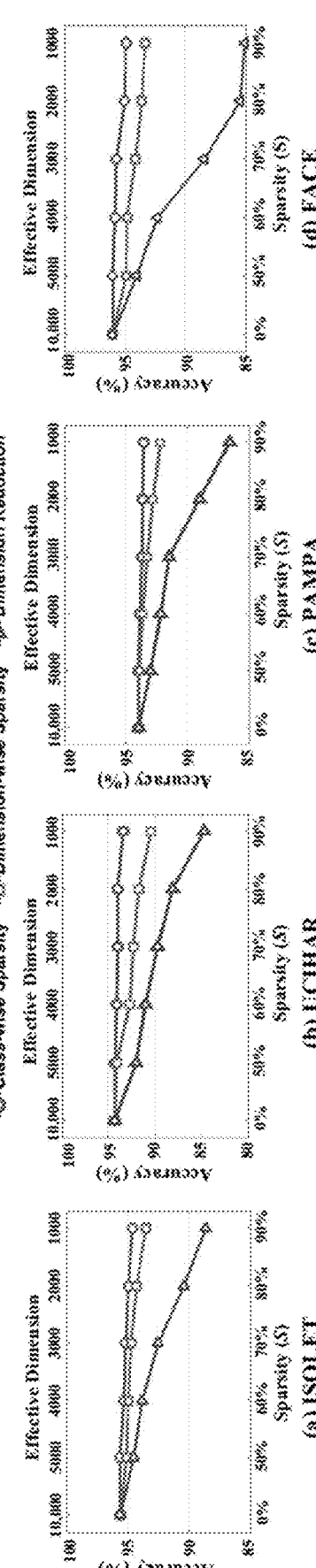
FIG. 11a-d

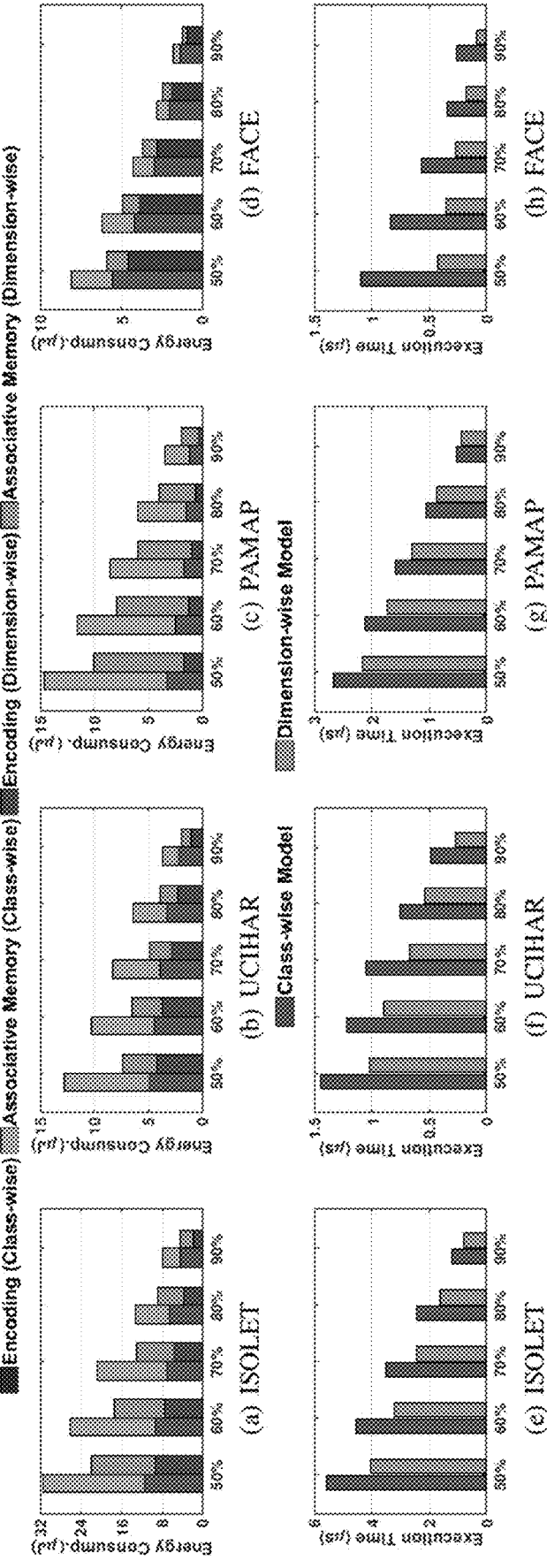
FIG. 12a-h

Table 2:  Normalized Energy-delay product (EDP) improvement of applications ensuring different quality loss.

| Quality Loss | | 0% | 0.3% | 0.5% | 1% | 1.5% | 2% |
|---|---|---|---|---|---|---|---|
| ISOLET | *Dimension-wise* | 1× | 1× | 1× | 22.6× | 51.0× | 51.0× |
| | *Class-wise* | 4.1× | 6.1× | 9.9× | 22.6× | 76.1× | 76.1× |
| UCIHAR | *Dimension-wise* | 1× | 6.8× | 3.0× | 3.0× | 3.0× | 7.8× |
| | *Class-wise* | 1× | 4.2× | 10.7× | 10.7× | 29.4× | 29.4× |
| PAMPA | *Dimension-wise* | 1× | 3.9× | 3.9 | 11.1× | 24.7× | 24.7× |
| | *Class-wise* | 3.3× | 5.3× | 69.5× | 69.5× | 69.5× | 69.5× |
| FACE | *Dimension-wise* | 1× | 1× | 1× | 1× | 2.5× | 3.3× |
| | *Class-wise* | 1.2× | 4.5× | 4.5× | 11.3× | 23.7× | 23.7× |
| AVERAGE | *Dimension-wise* | 1× | 3.2× | 3.2× | 10.4× | 22.3× | 23.9× |
| | *Class-wise* | 2.4× | 5.0× | 11.4× | 28.5× | 49.7× | 49.7× |

FIG. 13

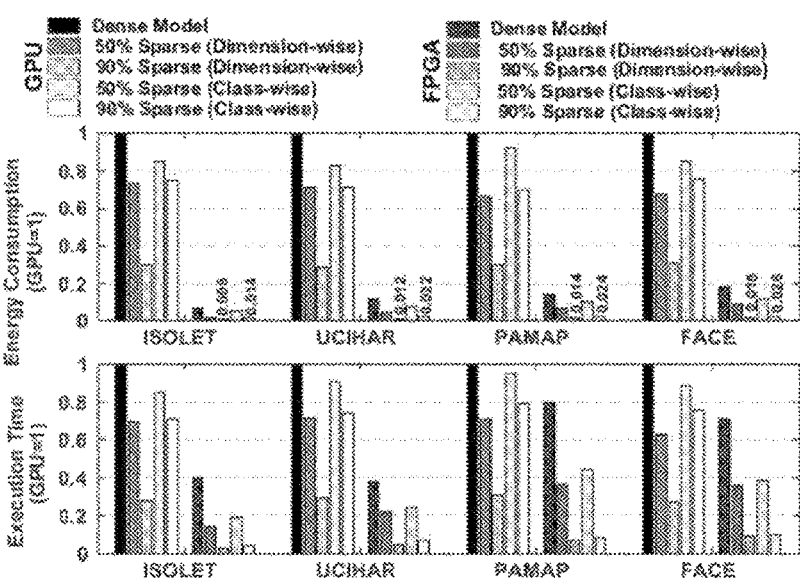

FIG. 14

| | Accuracy | | | | Training Execution Time (s) | | | | Testing Execution Time/sample (ms) | | | |
|---|---|---|---|---|---|---|---|---|---|---|---|---|
| | ISOLET | UCHAR | PAMPA | FACE | ISOLET | UCHAR | PAMPA | FACE | ISOLET | UCHAR | PAMPA | FACE |
| Support Vector Machine (SVM) | 95.8% | 94.7% | 94.5% | 95.8% | 38.56 | 22.48 | 66.88 | 14.64 | 18.56 | 7.55 | 6.15 | 0.64 |
| Random Forest | 90.1% | 91.2% | 95.7% | 91.2% | 8.32 | 8.88 | 4.56 | 23.68 | 4.44 | 4.24 | 5.63 | 0.39 |
| Naive Bayes | 84.2% | 83.8% | 90.2% | 88.8% | 1.98 | 6.24 | 1.10 | 2.16 | 2.66 | 0.94 | 5.60 | 1.48 |
| Gradient Boosting | 93.1% | 90.8% | 93.4% | 96.2% | 425.20 | 589.36 | 106.69 | 619.28 | 7.29 | 4.19 | 15.72 | 2.72 |
| Logistic Regression | 95.5% | 93.9% | 93.3% | 95.7% | 51.04 | 59.18 | 6.48 | 14.05 | 0.44 | 0.36 | 2.47 | 0.49 |
| Perceptron | 90.0% | 86.7% | 89.6% | 94.8% | 8.48 | 15.12 | 1.20 | 9.68 | 0.45 | 0.32 | 2.49 | 0.51 |
| Multi-Layer Perceptron (MLP) | 95.6% | 94.4% | 96.0% | 96.3% | 100.76 | 97.20 | 143.04 | 338.08 | 2.53 | 1.25 | 0.86 | 1.15 |
| Binarized Neural Network (BNN) | 94.3% | 94.3% | 95.2% | 96.4% | 563.44 | 689.65 | 1,162.8 | 1,825.4 | 1.38 | 0.83 | 0.61 | 0.80 |
| SparseHD | 95.7% | 94.4% | 94.3% | 96.6% | 25.12 | 22.48 | 4.32 | 9.84 | 1.21 | 0.44 | 0.92 | 0.65 |

FIG. 17

METHODS OF PROVIDING TRAINED HYPERDIMENSIONAL MACHINE LEARNING MODELS HAVING CLASSES WITH REDUCED ELEMENTS AND RELATED COMPUTING SYSTEMS

CLAIM FOR PRIORITY

This application claims priority to Provisional Application Ser. No. 63/006,419, filed on Apr. 7, 2020 titled SparseHD: Sparsity-Based Hyperdimensional Computing For Efficient Hardware Acceleration, the entire disclosure of which is hereby incorporated herein by reference.

STATEMENT OF GOVERNMENT SUPPORT

This invention was made with government support under Grant No. HR0011-18-3-0004 awarded by the Department of Defense Advanced Research Projects Agency (DARPA). The government has certain rights in the invention.

BACKGROUND

With the emergence of the Internet of Things (IoT), many applications run machine learning algorithms to perform cognitive tasks. The learning algorithms have been shown effectiveness for many tasks, e.g., object tracking, speech recognition, image classification, etc. However, since sensory and embedded devices are generating massive data streams, it poses huge technical challenges due to limited device resources. For example, although Deep Neural Networks (DNNs) such as AlexNet and GoogleNet have provided high classification accuracy for complex image classification tasks, their high computational complexity and memory requirement hinder usability to a broad variety of real-life (embedded) applications where the device resources and power budget is limited. Furthermore, in IoT systems, sending all the data to the powerful computing environment, e.g., cloud, cannot guarantee scalability and real-time response. It is also often undesirable due to privacy and security concerns. Thus, we need alternative computing methods that can run the large amount of data at least partly on the less-powerful IoT devices.

Brain-inspired Hyperdimensional (HD) computing has been proposed as the alternative computing method that processes the cognitive tasks in a more light-weight way. The HD computing is developed based on the fact that brains compute with patterns of neural activity which are not readily associated with numerical numbers. Recent research instead have utilized high dimension vectors (e.g., more than a thousand dimension), called hypervectors, to represent the neural activities, and showed successful progress for many cognitive tasks such as activity recognition, object recognition, language recognition, and bio-signal classification.

SUMMARY

Embodiments according to the invention can provide methods of providing trained hyperdimensional machine learning models having classes with reduced elements and related computing systems. Pursuant to these embodiments, a method of providing a trained machine learning model can include providing a trained non-binary hyperdimensional machine learning model that includes a plurality of trained hypervector classes, wherein each of the trained hypervector classes includes N elements, and then, eliminating selected ones of the N elements from the trained non-binary hyperdimensional machine learning model based on whether the selected element has a similarity with other ones of the N elements, to provide a sparsified trained non-binary hyperdimensional machine learning model.

BRIEF DESCRIPTION OF THE DRAWINGS

FIG. 4 is a table showing classification accuracy and efficiency of HD using binarized and non-binarized model in some embodiments according to the invention.

FIG. 7 is a chart showing a trained SparseHD class-wise sparsity model and the distribution of the absolute class values in a trained model in some embodiments according to the invention.

FIGS. 8A-D are graphs showing classification accuracy of the SparseHD during different retraining iterations in some embodiments according to the invention.

FIGS. 11A-D are graphs illustrating the impact of sparsity on the classification accuracy of the class-wise and dimension-wise sparse models where the curves depicted by the triangles correspond to dense HD models with smaller dimensionality such that the number of dimensions matches the number of non-zeros in the sparse hypervectors in some embodiments according to the invention.

FIGS. 12A-H are graphs of energy consumption and execution time of FPGA-based implementation of SparseHD with class-wise and dimension-wise models in different sparsity in some embodiments according to the invention.

FIG. 13 is a table showing normalized energy-delay product (EDP) improvement of applications ensuring different quality loss in some embodiments according to the invention.

FIG. 14 shows graphs illustrating energy consumption and execution time of the baseline HD on CPU, GPI an FPGA platforms in some embodiments according to the invention.

FIG. 17 is a comparison of SparseHD with other lightweight classification algorithms in terms of Accuracy, and training and test efficiency running on Raspberry Pi3 (ARM Cortex A53) in some embodiments according to the invention.

DETAILED DESCRIPTION OF EMBODIMENTS ACCORDING TO THE INVENTION

Figure 1:
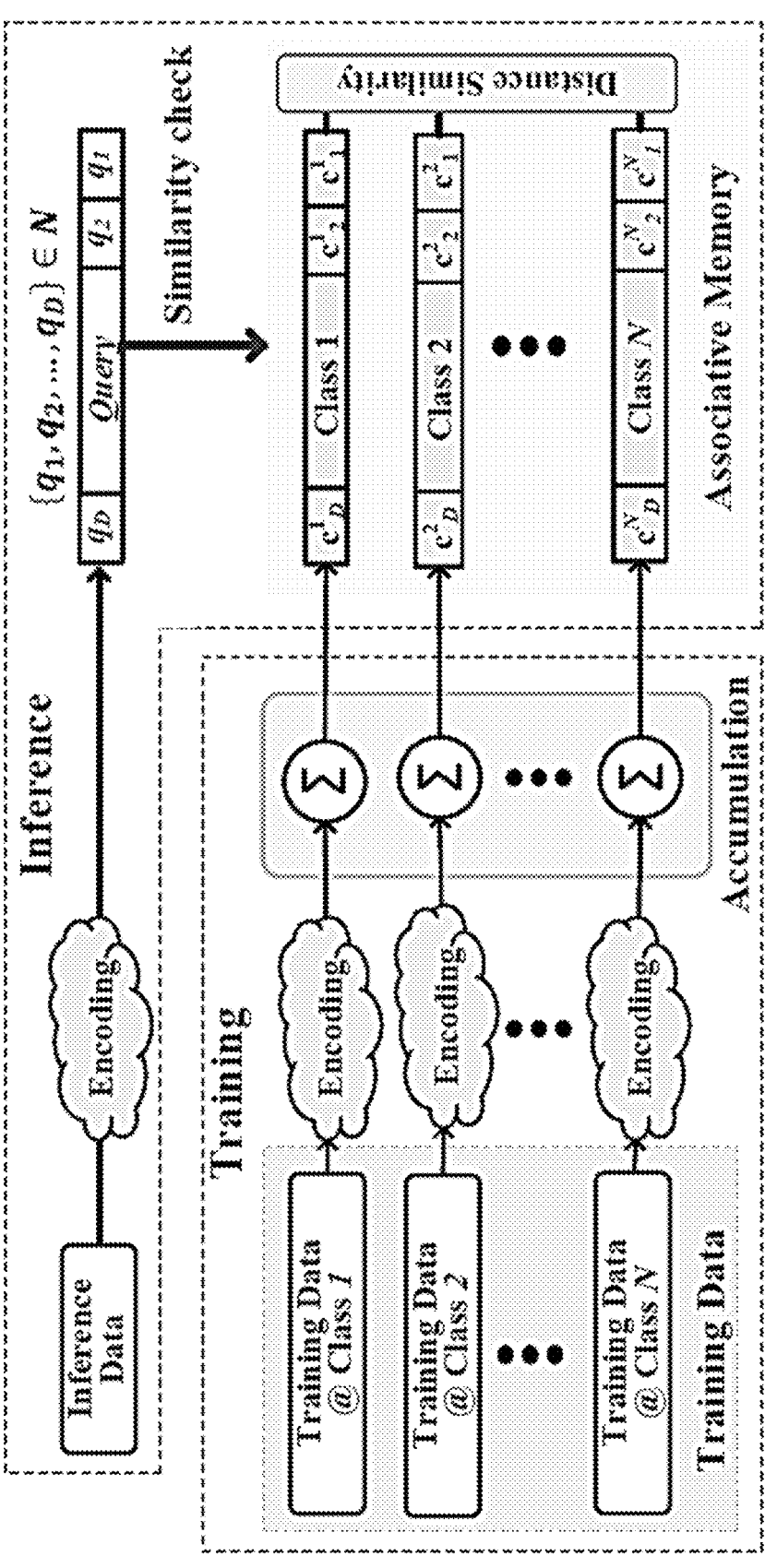
FIG. 1 shows an overview of the HD classification including encoding and associative memory modules in some embodiments according to the invention.

As appreciated by the present invention, in order to apply hyperdimensional (HD) computing to realistic cognitive tasks, a hypervector used should include numeric values for the thousands of dimensions of the hypervector. For example, for a face recognition task, using this approach can increase the classification accuracy by more than 50%. However, this also significantly sacrifices energy efficiency and performance, even when using simple integers as the hypervector dimensional elements.

To address this issue, an HD acceleration framework, sometimes referred to herein as a "SparseHD framework" or simply as "SparseHD," is disclosed herein which exploits advantages of sparsity in order to improve the efficiency of the HD computing. The SparseHD framework takes account of statistical properties of the trained HD model and drops the least important class elements. To compensate for the possible quality loss coming from the sparsity, SparseHD retrains the HD model iteratively and adapts a new model to work with the sparsity constraints.

A new FPGA-based accelerator is also disclosed that utilizes the advantage of sparsity in the HD computation. We evaluated the efficiency of the HD framework for practical classification problems. We observed that SparseHD makes the HD model up to 90% sparse while affording a minimal quality loss (less than 1%) compared to the baseline non-sparse model. Our evaluation showed that running HD with the same sparsity model, SparseHD on average provides 48.5× lower energy consumption and 15.0× faster execution as compared to the AMD R390 GPU, while providing a similar classification accuracy.

In the HD computing, training data are combined into a set of hypervectors, called a HD model, through light-weight computation steps. Then, each hypervector in the model represent a class of the target classification problem. In some embodiments according to the present invention, it can significantly reduce the accuracy of the corresponding learning model. For example, when using non-binary hypervectors (i.e., using numeric values for hypervector elements), we observed accuracy improvement of more than 50% for practical image recognition tasks.

The HD acceleration framework takes advantage of statistical properties of HD models to make trained hypervectors sparse without losing the quality of inference. It reformulates the trained HD model to enforce sparsity by ignoring the least important features in the trained hypervectors. In some embodiments according to the invention, two approaches can be used for enforcing sparsity: (i) class-wise sparsity which independently sparsifies hypervectors for each class by ignoring the hypervector elements that have small absolute values, and (ii) dimension-wise sparsity that identifies common (non-informative) features across all learned hypervectors and removes the feature from all classes.

In some embodiments according to the invention, a sparse HD computing method can enable sparsity on the trained HD model regardless of classification problems. An automated technique can iteratively retrains HD models to compensate for the quality loss which is possible due to model sparsity. In some embodiments according to the invention, SparseHD can make the HD model sparse up to 90% while providing similar accuracy to the non-sparsed baseline model.

In some embodiments according to the invention, Implementation of a user-friendly FPGA library for sparse HD computation that supports both the class-wise and dimension-wise sparse models. The proposed FPGA acceleration is implemented with a pipeline structure and it fully utilizes the FPGA resources in order to maximize performance.

In some embodiments according to the invention, evaluation showed that running HD with the same sparsity model, SparseHD on average provides 48.5× lower energy consumption and 15.0× faster execution as compared to the AMD R390 GPU, while providing a similar classification accuracy.

HD provides a general model of computing which can be applied to different types of learning problems. Classification is one of the most important supervised learning algorithms. FIG. 1 shows the overview of HD computing architecture for a classification problem consisting of an encoder module and an associative memory. The encoding module maps input data to a vector in high dimensional space, called hypervector. During the training phase, all data corresponding to a particular class are encoded and the pertinent hypervectors are combined together to generate a class hypervector. Therefore, at the end of training, there is one hypervector representing each category. These class hypervectors are stored in an associative memory. In the inference (test) phase, an unknown input data is mapped to a query hypervector using the same encoding module used for training. The (query) hypervector is then compared to all (class) hypervectors to determine the classification result. In the remainder of this section, we describe the functionality of each module in details.

HD uses a generic encoding which can map all data types to high dimensional space. HD does not extract features from raw data, thus, should be implemented on the pre-processed data. The pre-processing can be different depending on the application. For example, a voice signal can be transferred to a Mel-Frequency Cepstral Coefficients (MFCCs) feature vector. For image data, the Histogram of Oriented Gradient (HoG), HAAR-like feature, and convolution are well-known feature extractors. Using any of these methods the extracted feature vector can be further analyzed by HD computing.

Figure 2:
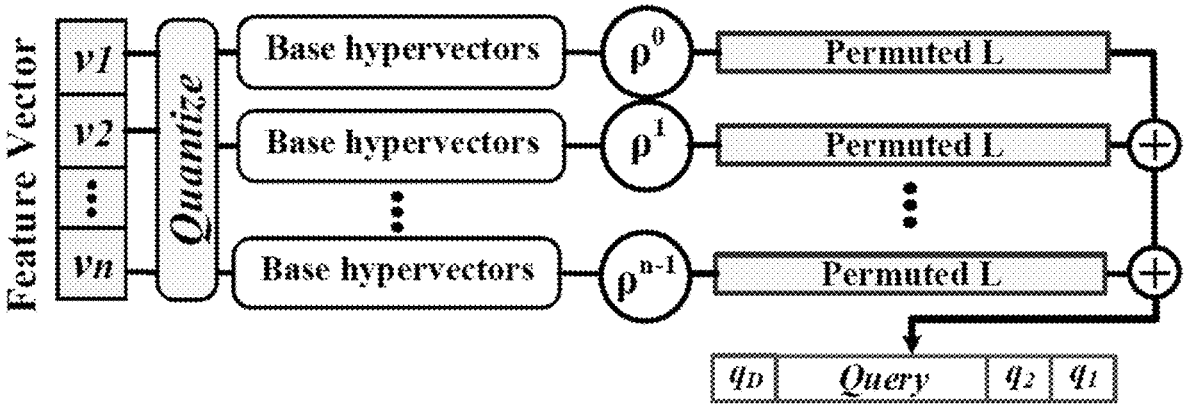
FIG. 2 shows how an encoding module maps a feature vector to a high-dimensioned space using pre-generated base hypervectors in some embodiments according to the invention.

FIG. 2 shows how and encoding module can map data points, v, to the high-dimensional space using the precomputed hypervectors. Consider a feature vector $v=\langle v_1, \ldots, v_n \rangle$. The encoding module takes this n-dimensional vector and converts it into a D-dimensional hypervector (D>>n). The encoding can be performed in three steps, which are describe below.

Figure 3:
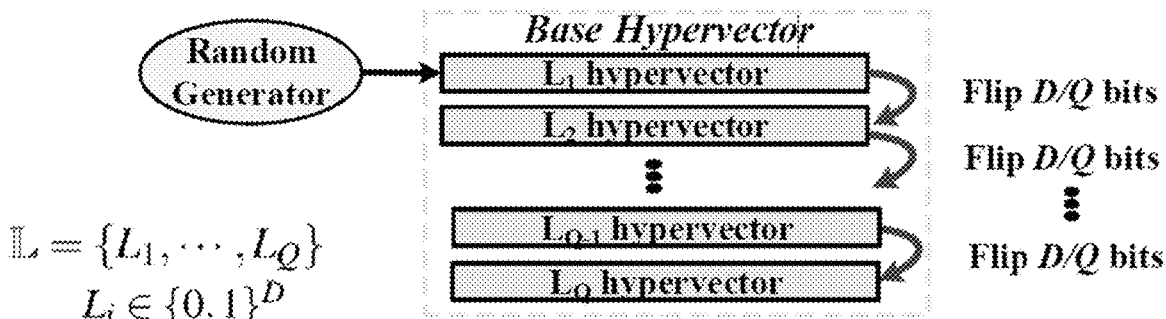
FIG. 3 is a block diagram depicting generating base hypervectors in some embodiments according to the invention.

As FIG. 2 shows, sets of pre-computed level or base hypervectors were used to consider the impact of each feature value. To create such level hypervectors, we compute the minimum and maximum feature values among all data points, say $v_{min}$ and $v_{max}$, and then quantize the range of $[v_{min}, v_{max}]$ into Q levels, $\mathbb{L}=\{L_1, \ldots, L_Q\}$. Each of these quantized scalars will correspond to a D-dimensional hypervector. Each level hypervector, $L_i$, is unique and has D binarized dimensions, i.e., $L_i \in \{0,1\}^D$. FIG. 3 shows how the base hypervectors can be generated. We create the first level hypervector, $L_1$, by randomly filling each element with either 0 or 1 value. The second level hypervector, $L_2$ is created by flipping D/Q random dimensions of the $L_1$. This continues until creating the $L_Q$ hypervector by flipping $L_{Q-1}$ dimensions. Since we select and flip the dimensions randomly, with high probably the $L_1$ and $L_Q$ will have D/2 dimension difference. As a result, the level hypervectors have similar values if the corresponding original data are closer, while $L_1$ and $L_Q$ will be nearly orthogonal. Note that for data with quantized bases, e.g., text or DNA sequences, the level hypervectors do not need to have correlation, thus they can be generated randomly.

Once the base hypervectors are generated, each of the n elements of the vector v are independently quantized and mapped to one of the base hypervectors. The result of this step is n different binary hypervectors, each of which is D-dimensional.

The n (binary) hypervectors can be combined into a single D-dimensional (non-binary) hypervector. As appreciated by the present inventors, one approach for aggregation would be to simply add all of the n hypervectors together. This approach, however, does not take account of the index of the feature indices. To differentiate the impact of each feature index, Permutation can be used. We know from random binary values that the permutation of different feature indexes are nearly orthogonal:

$$\delta(L, \rho^{(i)}L) \approx D/2 \, (0 < i \leq n)$$

where the similarity metric, $\delta$, is the Hamming distance between the two hypervectors, and $\rho^{(i)}L$ is the i-bit rotational shift of L. The orthogonality of a hypervector and its per-mutation (i.e. circular bitwise rotation) is ensured as long as the hypervector dimensionality is large enough compared to the number of features in the original data point (D>>n). The aggregation of the n binary hypervectors is computed as follows:

$$H = \bar{L}_1 + \rho \bar{L}_2 + \ldots + \rho^{(n-1)} \bar{L}_n.$$

where, H is the (non-binary) aggregation and $\bar{L}_i$ is the (binary) hypervector corresponding to the i-th feature of vector v.

The described encoding also works for data points with a variable length such as text-like data where the encoding can be applied on fixed-size n-gram windows.

After mapping the input data to high dimensional space, a trainer block, shown in FIG. 1, combines the encoded data points in order to create class hypervectors. This training simply adds all encoded hypervectors which belong to the same class. In a face detection task, for instance, the trainer adds all hypervectors which have the "face" tag and "non-face" tags in two different hypervectors. The element-wise addition of hyper-vectors in training results in non-binarized class hypervectors, i.e., $H \in \mathbf{N}^D$. For a given hypervector, $H^i = \langle h_D, \ldots, h_1 \rangle$ in $i^{th}$ class, the non-binarized model can be generated as follows:

$$C^i = \sum_j H^i_j = \langle c^i_D, \ldots \check{\,}, c^i_1 \rangle$$

To perform the classification on binarized hypervectors, we can apply a majority function on non-binarized class hypervectors. For a given class hypervector, $C = \langle c_D, \ldots, c_1 \rangle$, the majority function is defined as follows:

$$MAJ(C, \tau) = \langle c'_D, \ldots, c'_1 \rangle \text{ where } c'_j = \begin{cases} 0, & \text{if } c_j < \tau \\ 1, & \text{otherwise} \end{cases}.$$

Using the majority function, the final hypervector for each data point is encoded by $C' = MAJ(C, \tau)$, and $C' \in \{0, 1\}^D$ and $\tau = n/2$.

After training, all class hypervectors are stored in an as-sociative memory (as shown in FIG. 1). In the inference, an input data is encoded to a query hypervector using the same encoding module used for training. The associative memory is responsible to compare the similarity of the query hypervector with all stored class hypervectors and select a class with the highest similarity. HD can use different metrics to find a class hypervector with the most similarity to query hypervector. For a class hypervectors with binarized values, Hamming distance is an inexpensive and suitable similarity metric, while class hypervectors with non-binarized elements require to use Cosine similarity.

Existing HD computing methods may use binarized class hypervectors in order to eliminate using costly Cosine operation. In addition, existing HD hardware accelerators may only support Hamming distance similarity over vectors with 10,000 dimensions. However, as appreciated by the present inventors, HD using binarized hypervectors cannot provide acceptable classification accuracy on majority of classification problems.

FIG. 4 shows the HD classification accuracy for six applications including: language recognition, gesture detection, speech recognition, activity recognition, physical monitoring, and face detection. The results are reported for the HD using binarized and non-binarized class elements. In this table, N and n are showing the number of classes and features respectively. Embodiments according to the present invention show that except for language recognition, HD accuracy using binarized model is significantly lower than HD using non-binarized model. In fact, to provide acceptable classification accuracy on realistic problems, e.g., face or activity recognition, HD has to use class hypervectors with non-binarized elements. For example, for face detection task, binarized HD achieves 38.9% classification accuracy, which is much lower than 96.1% accuracy that non-binarized HD can achieve.

The results in FIG. 4 also compares the execution time of HD with binarized and non-binarized models running on embedded devices (Raspberry Pi 3) using ARM Cortex A53 CPU. Our results on six classification problems show that HD with non-binarized model provides 17.5% higher accuracy, but 6.5× slower computation as compared to HD with binarized model. The lower efficiency of the non-binarize model comes from the costly Cosine similarity metric which involves large number of additions/multiplications. This makes HD with non-binarized model less desirable to as light-weight classifier.

In some embodiments according to the invention, a generalized framework can enable sparsity in HD computing, which may significantly reduce the cost of HD computing by enabling sparsity in HD model while ensuring minimal impact on the quality of classification. In some embodiments according to the invention, SparseHD is provided with a trained HD model as an input and returns a new sparse model which can be used for the rest of the classification task. SparseHD can provide the efficiency of the binarized model as well as classification accuracy of the non-binarized model.

Figure 5:
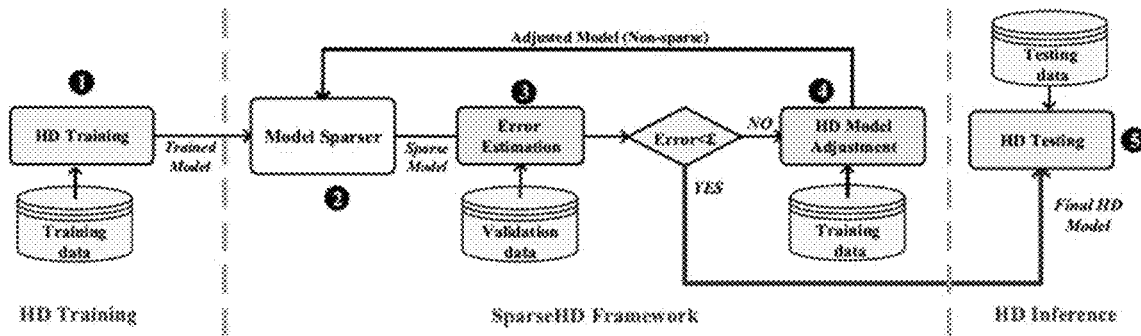
FIG. 5 is a flowchart illustrating operations of a SparseHD framework enabling sparsity in HD computing model in some embodiments according to the invention.

FIG. 5 shows the overview of the SparseHD framework in some embodiments according to the invention. SparseHD is provided with a trained HD model in non-binary dense representation as an input (1). For each class hypervector, Model Sparser drops S % of each class elements (2). The classification accuracy of sparse model is tested on the validation dataset, which is a part of original training dataset. Then, SparseHD compares the accuracy of HD with sparse and dense model to calculate the quality loss due to model sparsity $\Delta E = E_{Baseline} - E_{Sparse}$ (3). If this error is larger than a pre-defined s value, SparseHD adjusts the HD model by retraining the HD based on the sparsity constraint (4). Model adjustment may change the sparsity of class hypervectors, thus the Model Sparser resets the sparsity of the HD model to desired level. The processes of model adjustment and sparsity repeat iteratively until the convergence condition is satisfied. Finally, the new sparse model is sent to the inference in order to be used for the classification task (5).

Figure 6:
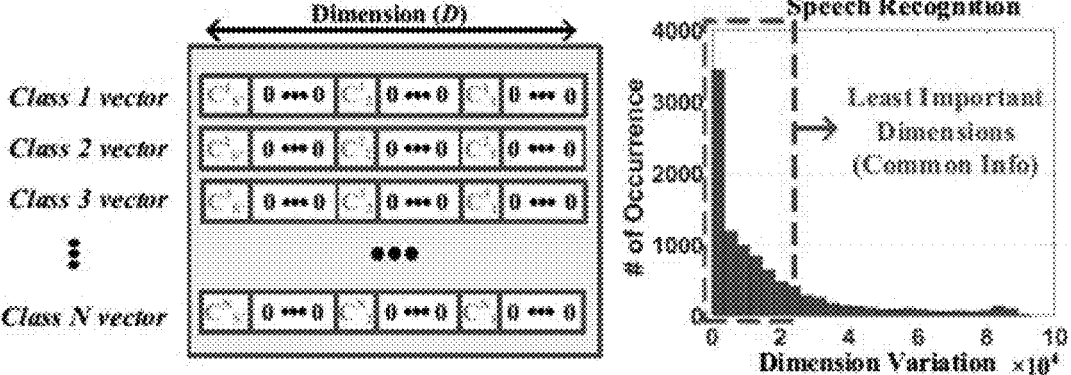
FIG. 6 is a chart showing a SparseHD dimension-wise sparsity model and distribution of the values variation ($\Delta(V)$) in all dimensions of the class hypervectors in some embodiments according to the invention.

In some embodiments of the invention, alternative approaches can be taken to make the HD computing model sparse: dimension-wise and class-wise sparsity. The dimension-wise sparsity makes the trained HD models sparse by dropping the same dimensions for all existing classes, while the class-wise method makes each class hypervector sparse individually. FIGS. 6 and 7, respectively, show an example of class elements using dimension-wise and class-wise sparsity.

As an introduction to sparsity in HD computing, the main computations involved in HD computing with non-binarized model are now presented. In the inference, HD computation encodes an input data to a query hypervector, $Q = \{q_D, \ldots, q_2, q_1\}$, and then associative memory measures the Cosine similarity of such query with N stored class hypervectors $\{C^1, \ldots, C^N\}$, where $C^i = \{c^i_D, \ldots, c^i_2, c^i_1\}$ is the class hypervector corresponding to $i^{th}$ class (FIG. 1). The Cosine similarity can be expressed as $\cos(Q, C^i) = Q.C^i/|Q||C^i|$, where $Q.C^i$ indicates dot product between the hypervectors, and $|Q|$ and $|C^i|$ show the magnitudes of the query and $i^{th}$ class hypervector. However, it may be expensive to calculate the operands magnitude every time. When we look for the Cosine similarity of Q with class hypervectors $\{C^1, \ldots, C^N\}$, Q is common between all classes. Thus, we can ignore calculating $|Q|$, since the goal of HD is to find the maximum relative similarity not the exact Cosine values. On the other hand, the magnitude of each class hypervector, ICI, can be computed once in offline after the training, therefore the associative memory can store the normalized class hypervectors $(C^i/|C^i|$ for $I \in 1, \ldots, N)$. This simplifies the Cosine similarity to a dot product between two hypervectors at inference which can be computed in much lower cost compared to Cosine.

In some embodiments according to the invention, the HD model may be made sparse (i.e., "sparsified") is to enable column or dimension-wise sparsity. The goal of HD computing at inference is to find a class hypervector which has the highest Cosine similarity to a query hypervector. Therefore, this similarity is relative among the class hypervectors. We observe that not all dimensions of the class hypervectors have useful information which can differentiate one class from others. In fact, in several dimensions, all class hypervectors store common information which is shared among all classes. When calculating the Cosine similarity, such dimensions add relatively similar weight to all classes.

While looking for the similarity (dot product) of the Q with class hypervector $\{C^1, \ldots, C^N\}$, Q is common among all the class hypervectors. Therefore, regardless of the elements of Q, the dimensions where all classes have similar values have low impact on differentiating the classes. In order to enable dimension-wise sparsity in HD computing, our framework measures the changes in the class elements in each dimension. The following equation shows the variation in the jth dimension of the class hypervectors:

$$\Delta(V_j) = \max\{c_j^1, \ldots, c_j^N\} - \min\{c_j^1, \ldots, c_j^N\} j \in \{1, 2, \ldots, D\}$$

After measuring the variation in all dimensions, $\{\Delta(V_1), \ldots, \Delta(V_D)\}$, SparseHD selects the dimensions with the lowest $\Delta(V)$ as the best candidates to be dropped from the HD model, since those dimensions have the least impact on differentiating the classes. FIG. 6 shows the histogram distribution of the $\Delta(V)$ in all dimensions of the class hypervectors for speech recognition (ISOLET Dataset) with 26 classes as well as a representation of the Class hypervectors that result in the taking advantage of the observation of the data shown in the histogram by eliminating selected ones of the elements (by making those values=zero as shown on the left). As shown by the results, many dimensions have low variation in values across classes in HD. This implies that all classes have similar values in those dimensions. Note that for all six tested applications, we observed that $\Delta(V)$ has similar distribution. This is because feature vectors have many similar patterns in the original domain which get distributed uniformly in high-dimensional space. For S % sparsity, SparseHD selects $S/100 \times D$ dimensions with the least $\Delta(V)$ and makes the class elements zero for these dimensions. As FIG. 6 shows, dimension-wise method provides a new sparse model which can be considered a dense-like model but with lower dimensionality.

In some embodiments according to the invention, in class-wise sparsity, the goal is to drop the class elements which have the least impact on the Cosine similarity. While calculating the Cosine similarity, the elements of a query hypervector are input dependent, thus they can change from one input to another one. Due to randomness of HD base hypervectors, averaging the query hypervectors results in a hypervector with uniform distribution of values in all dimensions. Using this assumption, class-wise sparsity needs to find the best class elements which can be dropped while having minimal impact on the Cosine similarity.

FIG. 7 shows the distribution of the absolute class values in a single class hypervector for speech recognition after training as well as a representation of the Class hypervectors that result in the taking advantage of the observation of the data shown in the histogram by eliminating selected ones of the elements (by making those values=zero as shown on the left). The graph visually shows the best candidates which can be dropped from a single class hypervector. In fact, the values with the least absolute values are the best candidates which can be dropped while causing least impact on the Cosine similarity. For example, for $i^{th}$ class hypervector, we select S % elements with minimum absolute value using the following equations:

$$\min{}^S\{c^i_D, \ldots, c^i_2, c^i_1\} j \in \{1, 2, \ldots, N\}$$

To make model with S % sparsity, SparseHD makes $S/100 \times D$ elements of each class hypervector zero. This method reduces the number of required operations, since it ensures each class hypervector will not have more than (1−S/100)×D non-zero elements. The sparsity of class hypervectors can significantly accelerate the performance of HD by reducing the number of required multiplications and additions. For example, class hypervectors with 90% sparsity just involve 0.1×D×N additions and multiplications to perform Cosine similarity.

Making the hypervectors sparse may have impact on the HD classification accuracy, since the design was not originally trained to work with sparse hypervectors. Our design estimates the error rate of the new model by checking the average accuracy of the HD with the sparse model on validation data which is a part of original training dataset. SparseHD estimates the quality loss by comparing the error of the sparse model with the baseline HD model, $\Delta E = E_{Baseline} - E_{Sparse}$.

In order to compensate for the quality loss due to model sparsity, we adjust the model based on the new constraints. Model adjustment is similar to training procedure and its goal is to modify the sparse model in order to provide higher accuracy over training data. HD looks at the similarity of each input hypervector to all stored class hypervectors; (i) if a query hypervector, Q, is correctly classified by the current model, our design does not change the model. (ii) While if it is wrongly matched with the $i^{th}$ class hypervector (C) when it actually belongs to $j^{th}$ class (C), our retraining procedure subtracts the query hypervector from the $i^{th}$ class and adds it to $j^{th}$ class hypervector:

$$\overline{C}^i = C^i - Q \& \overline{C} = C^j + Q$$

After adjusting the model over training data, the class elements may not keep their S % sparsity. Therefore, our framework repeats the same algorithm by making the least important elements of the new class zero to ensure the S % sparsity in class hypervectors. Then, it again estimates the classification error rate over validation data. We expect the model retrained under the modified condition to become more fitted and provide higher accuracy. If an error criterion is not satisfied, we perform the same procedure until an error rate, E, is satisfied or we reach a pre-defined number of iterations (60 iterations). After the iterations, the new sparse model is stored into the hardware for real-time computing at inference.

FIG. 8 shows the SparseHD classification accuracy over consecutive retraining iterations. For each application, we show the result for 70% sparsity using dimension-wise and class-wise sparsity. Our evaluation shows that our framework can compensate the quality loss due to the use of sparse model after a few retraining iterations.

The baseline HD computing code involves large number of multiplications which can be parallelized on GPU or FPGA platforms. However, GPUs are designed for dense computations and cannot benefit much from the sparse model. FPGA is a configurable hardware and it is a suitable platform to accelerate SparseHD computation. Accordingly, we designed an FPGA-based implementation of SparseHD which exploits the sparsity to significantly accelerate the HD computation inference. SparseHD is built of encoding and associative memory modules. Due to the resource constraints of FPGA, the encoding module and associative memory cannot process all D=10,000 dimensions of hypervectors at the same time. As a result, we need to process dimensions in batches of d dimensions. This introduces a significant latency overhead. Therefore, the present structure can hide the delay of encoding module. In this implementation, at the time when encoding module generates the d dimensions of the query, the associative memory performs the similarity check on the d dimensions which were encoded in the previous iteration. In the following subsections, the details of the proposed FPGA-based implementation of encoding and associative memory module are described for both baseline/dimension-wise and class-wise sparse models.

In HD computing the encoding is based on the permutation and dimension-wise addition of the base hypervectors ($\mathbb{L} = \{L_1, \ldots, L_Q\}$). The number of base hypervectors, Q, depends on the number of levels that each feature is quantized to, while the number of permuted hypervectors depends on the number of features (FIG. 9A). Due to resource constraints of FPGA, the encoding module generates just d dimensions of the query hypervector every time. The value of d depends upon both the encoding and associative memory sizes.

Figure 9:
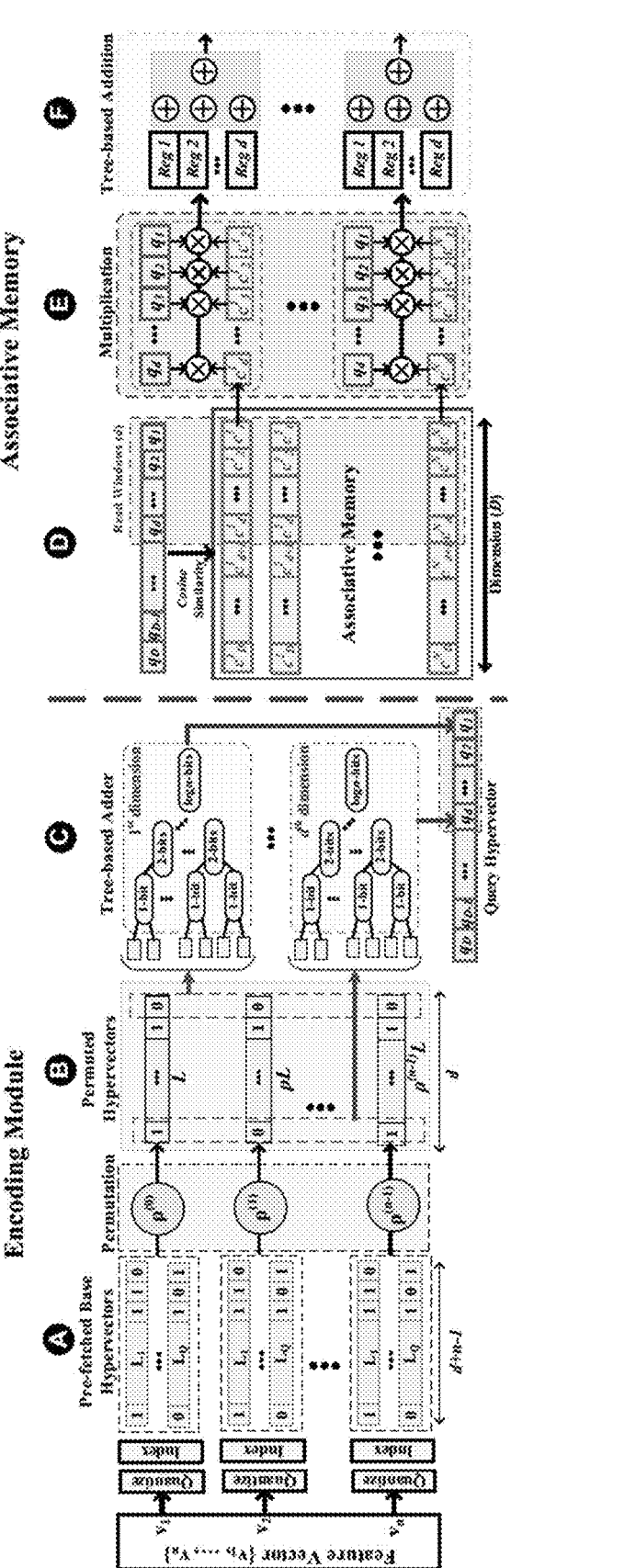
FIG. 9 is a block diagram of an FPGA implementation of the encoding module associative memory for baseline HD and SparseHD with dimension-wise sparsity in some embodiments according to the invention.

To accelerate the encoding process, the FPGA keeps all base hypervectors ($L \in \{0,1\}^D$) in FPGA. In encoding, the maximum number of required permutations is equal to n−1, where n is number of features. Therefore, to calculate the first dimension of the query hypervector, we only need to access $1^{st}$ to $n-1^{th}$ dimensions/bits of the base hypervectors, since the maximum right rotational shift (permutation) of the base hypervectors is equal to n−1 (for $n^{th}$ feature, as shown in FIG. 9). To generate the first d dimensions of the query hypervector, the encoding module only requires the indices $\{(n-1)+d, (n-2)+d, \ldots, 1\}$ of the base hypervectors. Similarly, for the $i^{th}$ iteration, our implementation only requires to pre-fetch the indices $\{(n-1)+d\times i, (n-2)+d\times i, \ldots, 1+d\times i\}$ from the base hypervectors. For each of the n entries (a.k.a. features) in the input vector v, the encoder module selects the pertinent base hypervector and permutes it depending on the feature index. The permutation is implemented by shifting a window through the base hypervector and reading d dimensions starting from $j+d\times i^{th}$ index in $i^{th}$ iteration, where j is the feature index ($1 \leq j \leq n$). This operation can be parallelized for all features as shown in FIG. 9B.

One of the most expensive parts of the encoding module is the addition of all permuted hypervectors. This addition is performed individually for each dimension. Since the base hypervectors are binarized ($L \in \{0,1\}^D$), the dimension-wise addition of the permuted hypervectors is similar to a count operation. Our design implements a tree-based pipelined structure to add the first bit of all n hypervectors. This structure uses a 1-bit full adder in the first stage and then increases the precision of the adders by one bit in each stage. Finally, in the last stage (log $n^{th}$ stage), a single log n-bit adder calculates the final result of addition of all n hypervectors (FIG. 9C). The size of this tree-based adder depends on the number of features (n) which is different for each application.

To parallelize the addition on all dimensions, SparseHD implements d instances of the same tree-based adder. These adders parallelize the encoding module in different dimensions. The number of dimensions which can be processed in parallel depends on the available FPGA resources and the number of features. These tree-based adders were implemented using LUTs and FFs. For the application with the largest feature size, e.g., ISOLET with n=617 features, the encoding module can generate the maximum of d=192 dimensions at each iteration. However, to balance the pipeline between the encoding module and the associative memory, the number of query elements generated by the encoding module should not exceed the number of elements that associative memory can process each time.

The encoding module can benefit from model sparsity. In both dimension-wise and class-wise sparse models, the encoding module can ignore generating the query elements for the dimensions for which class hypervectors have zero values since associative search will not use such elements of the query hypervector. For example, in dimension-wise model with S % sparsity, encoding module only requires to generate the query elements for those $(1-S/100) \times D$ dimensions where the class hypervectors have non-zero elements. Similarly, in class-wise model, there are several dimensions for which all the class hypervectors have zero value. SparseHD exploits this fact to accelerate the encoding module. To this end, SparseHD ignores adding the permuted hypervectors on the dimensions for which all classes have zero value. This can significantly reduce the amount of computational logic required and power consumption specially for dimension-wise sparse model. In addition, using the same number of resources, utilizing sparsity in the encoder module allows us to encode more query elements as compared to the baseline dense HD model.

FIG. 9 illustrates the architecture of the FPGA accelerator for SparseHD. Specifically, the flow diagram of the associative search here is shown for the dense model and/or for the dimension-wise sparsed HD model. Note that for the dimension-wise sparsity, the zero elements across all class hypervectors occur at the same indices. Therefore, the accelerator can remove the zero elements from all class hypervectors and perform a dense similarity check over the non-zero elements only. For example, for SparseHD with D=10, 000 and S=90% dimension-wise sparsity, HD only has 1000 effective dimensions. As described, the associative memory performs similarity search sequentially on d dimensional windows. Each query element is multiplied by the corresponding element in all class hypervectors (FIG. 9E). The multiplied values are accumulated in a tree-based adder structure (FIG. 9F). The number of input dimensions which our accelerator reads at a time, d, depends on two factors: (i) number of classes, (ii) number of available DSPs in FPGA. SparseHD was implemented on Kintex-7 FPGA KC705 Evaluation Kit with 840 DSPs. Depending on the application, the value of d can also be limited by the maximum number of query elements that the encoding module can generate (discussed earlier).

For HD with class-wise sparsity, the class hypervectors have non-zero elements in different indices. As such, for a given query hypervector, the non-zero element of each class hypervector multiply with different dimensions of the query hypervector. In order to enable HD to benefit from class-wise sparsity, our design applies another constraint on the class hypervectors. Instead of applying sparsity on the whole class hypervector, our design enables sparsity on a subset of the class elements, D'<D, which FPGA can read at once. For example, when FPGA reads D' dimensions of query, our design ensures that S % sparsity is satisfied in that subset. Using this method, FPGA can use much less resources, since it ensures that the number of non-zero elements in each subset is equal to $d=(1-S/100) \times D'$. Note that similar to the case of dimension-wise sparsity, the FPGA ignores generating query elements and associative search on the dimensions where all class elements happen to have zero values. The number of ignored elements depends on the sparsity. For example, for model with S=90% sparsity, speech recognition, activity recognition, physical monitoring, and face detection applications have 16%, 59%, 43%, and 74% zero dimensions, respectively.

Figure 10:
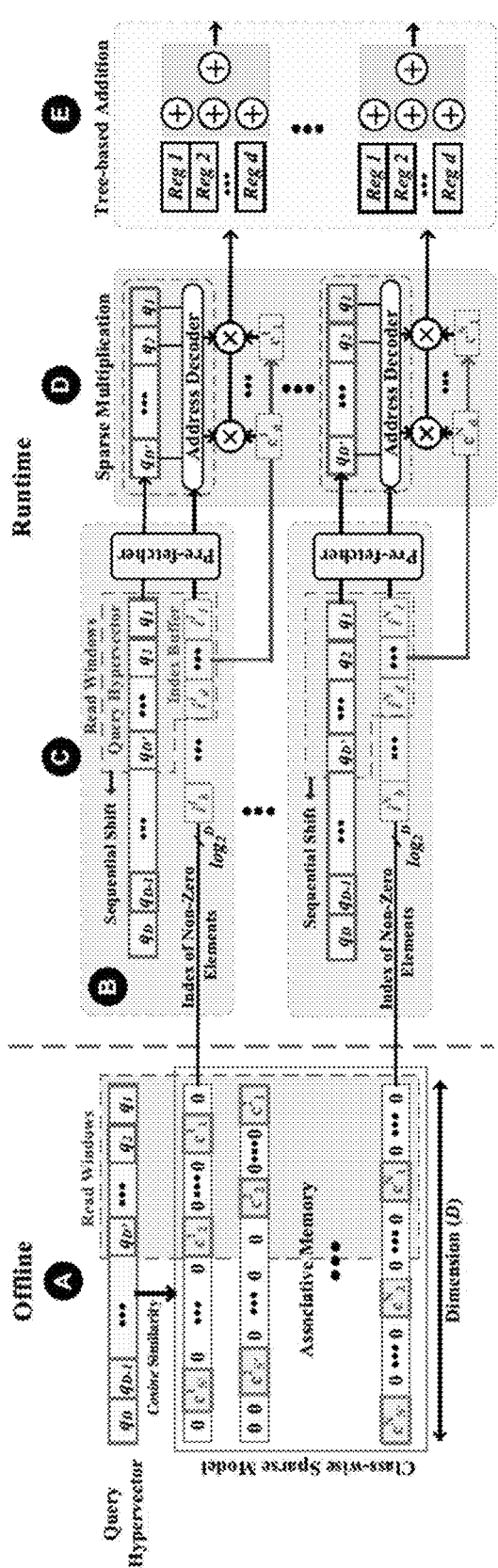
FIG. 10 is a block diagram of an FPGA implementation of the SparseHD with class-wise sparsity in some embodiments according to the invention.

FIGS. 10A-E show the FPGA implementation of SparseHD with class-wise sparsity. For each class hypervector, our class-wise implementation store indices of the non-zero elements in an index buffer (FIG. 10A). For a class with S % sparsity, each index buffer can have $b=(1-S/100) \times D$ non-zero elements where each index can be represented using $\log^D_2$ bits (FIG. 10B). To calculate the dot product between query and class hypervectors, our design reads the first D' dimensions of the query hypervector, $\{q_{D'}, \ldots, q_1\}$. These dimensions need to be multiplied with the first D' dimensions of all class hypervectors. Each class has sparse representation with d non-zero elements. Therefore, the read windows only access d elements of the index buffer. In some embodiments, the read window is shifted in order to sequentially multiply the non-zero class tor (FIG. 10C). Although query elements are stored in a memory inside FPGA, accessing them would be costly as we need to have D read ports. Our design removes the cost of memory access by pre-fetching the selected $\{q_{D'}, \ldots, q_1\}$ elements into another memory which can be accessed using D' read ports. Depending on the value of index buffer elements $\{i^1_d, \ldots, i^1_1\}$, address decoder selects d query elements from the pre-fetched memory in order to multiply them with the non-zero class elements. For each class, the results of d multiplications accumulate using a tree-based adder (FIG. 10E). Each time when the read windows have been shifted over dimensions of query hypervector, the generated values are accumulated in order to calculate the final result of dot product for each class.

The tasks performed by encoding module and associative memory are pipelined. The encoding module is mostly implemented using the Lookup Tables (LUT) and Flip-Flip (FF) block, while the associative search mostly uses Digital Signal Processing (DSP) blocks in order to perform the similarity check. Since these modules do not share many common resources, HD performs the encoding and associative search simultaneously on an FPGA. When associative memory checks the similarity of d dimensions of an encoded query hypervector with all stored class hypervectors, the encoding module can generate the next d dimensions of the query hypervector. The value of d is determined by the resource constraints of the encoding or associative memory modules, depending on the number of features and number of class hypervectors. This approach can hide the delay of the encoding module, when the encoding is faster than associative search. It happens when the number of features are small or the associative memory stores large number of classes.

SparseHD inference was implemented using Verilog. We verified the timing and the functionality of the sparse models by synthesizing them using Xilinx Vivado Design Suite. The synthesis code has been implemented on the Kintex-7 FPGA KC705 Evaluation Kit. The entire SparseHD software support including training, model adjustment, class-wise and dimension-wise sparsity, and error estimation have been implemented in C++ on CPU. We compared the performance and energy efficiency of the baseline HD code running on FPGA accelerator with AMD Radeon R390 GPU with 8 GB memory and Intel i7 CPU with 16 GB memory. For GPU, the HD code was implemented using OpenCL. For CPU, the HD code has been written in C++ and optimized for performance. We used AMD CodeXL and Hioki 3334 power meter for the power measurement of the GPU and CPU respectively.

We evaluated the efficiency of the proposed SparseHD on four practical classification problems listed below:

Speech Recognition (ISOLET): The goal was to recognize voice audio of the 26 letters of the English alphabet. The training and testing datasets are taken from the Isolet dataset.

Activity Recognition (UCIHAR): The objective is to recognize human activity based on 3-axial linear acceleration and 3-axial angular velocity that have been captured at a constant rate of 50 Hz.

Physical Activity Monitoring (PAMPA): This data set includes logs of 8 users and three 3D accelerometers positioned on arm, chest and ankle. The goal is to recognize 12 different human activities such as lying, walking, etc.

Face Detection: We exploit Caltech 10,000 web faces dataset. Negative training images, i.e., non-face images, are selected from CIFAR-100 and Pascal VOS 2012 datasets. For the HoG feature extraction, we divide a 32×32 image to 2×2 regions for three color channels and 8×8 regions for gray-scale.

FIGS. 11A-D show the classification accuracy of the baseline HD (0% sparsity) and SparseHD as the model sparsity increases from 50% to 90%. Our results show that SparseHD with both dimension-wise and class-wise models have very stable accuracy when the model sparsity scales up to 90%. Applications have different sensitivity to sparsity. For example, UCIHAR and FACE have higher quality loss as compared to ISOLET and PAMPA2 when the model sparsity is high. For ISOLET with S=90% sparse model, dimension-wise and class-wise models result in 2.1% and 1.1% quality loss as compare to baseline HD. For PAMPA, these quality losses reduce to 1.8% and 0.5% for dimension-wise and class-wise models respectively. Our results also show that at the same level of sparsity the class-wise model provides higher accuracy as compared to the dimension-wise model. In other words, the class-wise can work in higher sparsity while providing the same accuracy as dimension-wise model. This higher accuracy is due to the fact that the class-wise model exploits all D dimensions of the hypervectors to represent the class pattern, while the dimension-wise model reduces dimensionality by ignoring the entire dimensions for all existing classes, resulting in lower flexibility during the retraining process.

FIGS. 11A-D also compare the accuracy of SparseHD with a low dimensional model which has been trained with the same effective dimension as sparse models. For example, for the sparse model with D dimensions and S % sparsity, we train a low dimensional dense HD with $(1-S/100){\times}D$ dimensions. This is a reasonable comparison since the sparse models are expected to computationally cost similar to the low dimensional model. An advantage was given to the low dimensional HD and retrain it for 200 iterations which is the maximum number of iterations that SparseHD which was retrained to get the best sparse model. Evaluation showed that the low dimensional HD provides lower accuracy than the sparse model using the same effective dimensions. For example, when all designs have 1000 effective dimensions (S=90%), the low dimensional HD model provides in average 7.8% and 6.1% lower accuracy than class-wise and dimension-wise models. This lower accuracy comes from the fundamental concept behind HD which requires model to be built upon the nearly orthogonal base hypervectors. However, the mathematics governing the high dimensional space do not perfectly work when the hypervector dimensionality is reduced, e.g., D<<10,000. For example, the permutation cannot make the hypervector well orthogonal, i.e. $|\delta(L, \mu L)|{<}D/2{+}\varepsilon E$, where $\varepsilon$ is a large value (~D/2). In addition, the randomly generated level hypervectors are not nearly orthogonal in low dimensional space. In contrast, SparseHD with sparse model still ensures the same orthogonality of the hypervectors in the high dimensional space, e.g., D=10,000. SparseHD only ignores the least important model elements which have minimal impact on the HD accuracy.

FIG. 12A-D show the energy consumption of SparseHD on four applications accelerated on FPGA. The results have been measured for SparseHD using both class-wise and dimension-wise sparse models. The results also show the breakdown of energy for the encoding and associative memory blocks. The encoding module can take different portions of total energy consumption depending on the number of features and classes. As the results show, for both sparse models, the energy of encoding module improves with the sparsity of model. This improvement is due to the fact that higher sparsity decreases the number of non-zero dimensions and thus reduces the number of query elements which the encoding module needs to generate. Comparing different sparse models, we observe that for all applications the class-wise model consumes higher encoding energy as compared to the dimension-wise model. In the class-wise model, usually fewer dimensions are zero across all class hypervectors, while in dimension-wise sparse model the number of zero dimensions across all classes increases linearly with the model sparsity. Our results show that SparseHD with 90% sparsity on average reduces the effective number of query elements to 10% and 48% for dimension-wise and class-wise sparse models which results in 9.5× and 4.4× higher energy efficiency as compared to baseline HD encoding module.

Sparsity also improves the energy efficiency of associative memory for both class-wise and dimension-wise sparse models. Similar to encoding, at the same level of sparsity, the class-wise SparseHD provides lower efficiency than dimension-wise model. This is because in class-wise model the non-zero elements are distributed in all D dimensions of a hypervector, thus FPGA needs a large amount of sequential reads in order to perform all sparse multiplications between a query and class hyper-vectors. This incurs the overhead of reading more dimensions and storing the pre-fetched query dimensions. Thereby resulting in lower computation efficiency. In contrast, dimension-wise model reduces the hypervector dimensions, and the corresponding hardware does not have the overhead of reading non-zero dimensions.

FIGS. 12E-H show the execution time of the SparseHD using dimension-wise and class-wise models. SparseHD is implemented in a pipelined stage such that the delay of encoding module is hidden by the execution time of the associative memory which performs the similarity check. For each application, we fully utilized the FPGA resources in order to provide the maximum performance. Our evaluation shows that for both sparse models, SparseHD performance improves by increasing the sparsity of the class hypervectors.

The execution time of SparseHD is limited by the minimum encoding or associative memory throughput. The maximum number of query elements that SparseHD can process (d) at a time depends on feature size and number of classes. For SparseHD with large number of features, the encoding module is the bottleneck, while for SparseHD with large number of classes the associative memory limits the value of d. For example, in ISOLET with n=617 features and N=26 classes the associative memory (DSPs) limits d to 32, while in FACE with n=608 features and only N=2 classes, the encoding module (FFs and LUTs) limits the d value to 192. This large d value significantly improves the performance of the FACE as compared to applications with large number of classes. In addition, comparing the class-wise and dimension-wise models shows that dimension-wise associative memory mostly utilizes DSPs, while using less LUTs than the class-wise model. This enables the dimension-wise model to utilize the majority of FPGA LUTs for encoding module which results in providing a higher throughput.

There is a trade-off between the accuracy and efficiency when the sparsity of models increases. FIG. 13 lists the normalized energy-delay product (EDP) improvement of SparseHD using dimension-wise and class-wise models while ensuring different quality loss. The EDP results are relative to the FPGA-based implementation of the baseline non-sparse HD code. The quality loss, $\Delta E$, is defined as the difference between the classification accuracies of SparseHD and the baseline non-sparse HD. Although the class-wise model is less efficient than the dimension-wise model, the class-wise model provides higher efficiency than dimension-wise model at the same level of accuracy. This is because of the higher resistance of the class-wise model accuracy to sparsity which enables it to work with higher sparsity as compared to dimension-wise model. When SparseHD ensures less than 0.5% quality loss ($\Delta E=0.5\%$), the dimension-wise and class-wise models provide 3.2× and 11.4×EDP improvement as compared to the baseline HD model running on FPGA. Similarly, ensuring quality loss of less than 1% and 1.5%, SparseHD with the class-wise model achieves 28.5× and 49.7×EDP improvement as compared to the FPGA implementation of baseline HD.

FIG. 14 shows the energy consumption and execution time of HD computing applications running on three different platforms: Intel i7 CPU, AMD Radeon R390 GPU, and Kintex-7 FPGA KC705. All platforms run the baseline HD code with D=10,000 dimensions (called dense model) and the sparse model with 50% and 90% sparsity. For each application, the results of energy and execution time are normalized to GPU running HD computing with D=10,000 dimensions. Our evaluation shows that for all tested applications, FPGA can provide on average 8.7× (18.3×) lower energy consumption and 1.9× (178.4×) faster computation as compared to the GPU (CPU) when running HD in full dimension. The higher efficiency of the FPGA comes from its optimized implementation, high level of parallelism, and storing the HD model close to the computing units.

Our results show that Sparsity improves the efficiency of both GPU and FPGA platforms. However, this efficiency improvement is more significant on FPGA. For example, GPU running 90% class-wise (dimension-wise) sparse model can provide maximum 1.3× and 1.4× (3.5× and 3.3×) speedup and energy efficiency improvement to the GPU running a dense model. However, FPGA running class-wise (dimension-wise) model with the same sparsity can achieve 15.0×48.5× (19.7×84.1×) speedup and energy efficiency as compared to the GPU, respectively.

In GPU, although the dimension-wise model can get much faster computation than class-wise model (2.6× on average), the classification accuracy of the dimension-wise model is lower. In fact, the non-regular memory accesses of class-wise model makes it less suitable for GPU to exploit the sparsity.

In contrast, the FPGA implementation in some embodiments according to the invention can get the advantage of both class-wise and dimension-wise sparsity. For example, FPGA using 90% class-wise model can achieve 15.0× speedup to GPU, which is comparable to 19.7× speedup of FPGA on dimension-wise model. This enables HD to get higher stability of class-wise model to dimension reduction, while providing a high computation efficiency.

Figure 15:
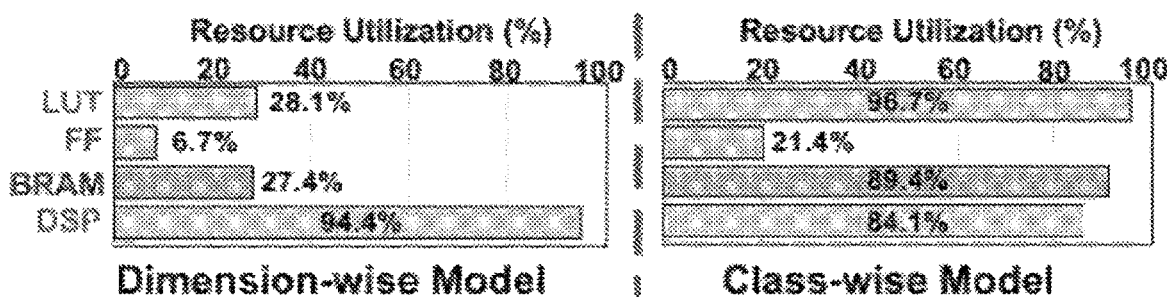
FIG. 15 shows FPGA resource utilization of class-wise and dimension-wise models in S=90% sparsity in some embodiments according to the invention.

FIG. 15 shows the FPGA resource utilization for SparseHD with both class-wise and dimension-wise sparsity (S=90%). Depending on the number of classes and the feature size of each application, the associative memory and encoding module have different resource utilization. Here, we show the resource utilization of ISOLET with N=26 classes and n=617 features. The resources utilized by encoding module mostly consists of LUTs and FFs which are used to store the pre-fetched base hypervectors and add them together. The encoding module of the class-wise model has higher resource utilization than dimension-wise model, since its needs to generate D' dimensions in each iteration, while the dimension-wise model generates just d (D'>d since d=S/100×D') query elements. In fact, the encoding module overall generates more number of query elements for the class-wise model since non-zero class values are distributed across all D dimensions. The dimension-wise and class-wise models also have different resource utilization while implementing the associative memory. In SparseHD with dimension-wise sparsity, associative memory mostly utilizes DSPs, while the class-wise model also uses LUTs and FFs in order to store the index buffer and pre-fetch the query hypervector. In addition, the pre-fetching in the class-wise model increases the BRAM utilization by 62.0% as compared to dimension-wise model. As results in FIG. 15 show, for ISOLET in dimension-wise model the number of DSPs limits the FPGA performance, while in the class-wise the high LUT utilization is a performance bottleneck.

Figure 16:
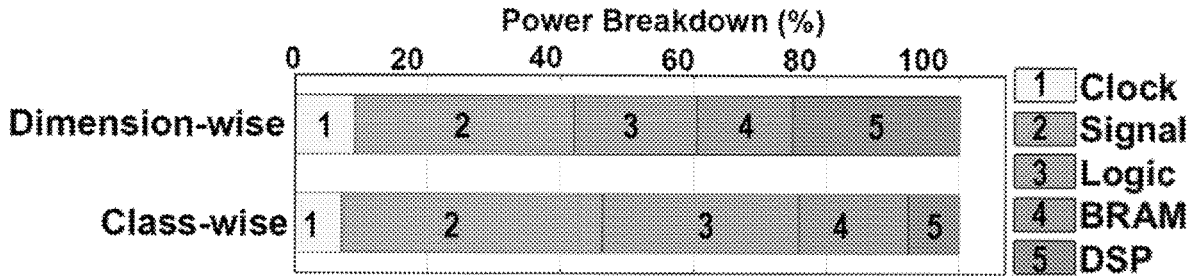
FIG. 16 depicts FPGA power breakdown of class-wise and dimension-wise models in S=90% sparsity in some embodiments according to the invention.

FIG. 16 also shows the breakdown of the SparseHD power consumption for both the dimension-wise and class-wise model implementing ISOLET. For both designs, the energy consumption of routing dominants the energy of encoding module, since the encoding requires to read n×d elements of the base hypervectors and rout them to a tree-based structure described herein. In the class-wise associative memory, the signals consume higher power consumption as compared to dimension-wise model due to the several routing used in the class-wise to implement index buffers and the pre-fetch module. In contrast, the dimension-wise model utilizes more DSPs which increases its power consumption as compared to class-wise model. For example, in dimension-wise model signals and DSPs are taking 32.9% and 25.2% of total power, while in class-wise model the signals take 48.1% power but the portion of DSPs from total power is less than 8.9%.

Embodiments according to the invention can be provided using programmable circuits, one or more components, modules, or mechanisms. Circuits are tangible entities configured to perform certain operations. In an example, circuits can be arranged (e.g., internally or with respect to external entities such as other circuits) in a specified manner. In an example, one or more computer systems or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, later, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits. The terminology used herein is for the purpose of describing embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems, and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A method of generating a sparsified non-binary hyperdimensional machine learning model configured for classification using a sparse-data memory structure, the method comprising:

accessing, by one or more processor circuits, a trained non-binary hyperdimensional machine learning model stored in memory, the trained non-binary hyperdimensional machine learning model comprising a plurality of class hypervectors, each class hypervector comprising a plurality of numeric-valued elements at respective index positions;

computing, by the one or more processor circuits, a variation metric for each index position, the variation metric representing a statistical difference among the numeric-valued elements at that index position across the plurality of class hypervectors, the computed variation metrics forming a set of variation metric values respectively associated with the index positions;

evaluating, by the one or more processor circuits, the index positions based at least in part on the set of variation metric values;

identifying, by the one or more processor circuits, a subset of the index positions selected based at least in part on the set of variation metric values;

modifying the trained non-binary hyperdimensional machine learning model by assigning a zero value to each numeric-valued element located at each index position in the identified subset, across each of the class hypervectors; and outputting a sparsified trained non-binary hyperdimensional machine learning model comprising the plurality of class hypervectors including zero-valued elements at the index positions in the identified subset, the sparsified trained non-binary hyperdimensional machine learning model including a structure that enables compression or skipping of the zero-valued elements during memory access or computation in classification operations.

2. The method of claim 1, wherein each numeric-valued element located at each index position in the identified subset of the index positions corresponds to an element having a same index within all class hypervectors of the trained non-binary hyperdimensional machine learning model and wherein the numeric-valued elements at the corresponding index positions have respective values that are all equal or about equal to one another.

3. The method of claim 2, further comprising:

receiving a sparsification level input representing a target sparsification level for the sparsified trained non-binary hyperdimensional machine learning model;

determining a distribution of the numeric-valued elements located at the index positions across the plurality of class hypervectors in the trained non-binary hyperdimensional machine learning model;

identifying a range of the values within the distribution that provides the target sparsification level for the sparsified trained non-binary hyperdimensional machine learning model if the elements within the range of values are eliminated from the trained non-binary hyperdimensional machine learning model; and providing the elements within the range of values as the numeric-valued elements located at index positions to be assigned a zero value.

4. The method of claim 3, wherein each numeric-valued element located at an index position within the identified range of values is assigned a zero value.

5. The method of claim 1, wherein each numeric-valued element located at an index position in the identified subset of the index positions includes each element with a same index within all class hypervectors of the trained non-binary hyperdimensional machine learning model and all have an equal or about equal effect on a cosine similarity score with a query hypervector.

6. The method of claim 1, wherein the numeric-valued elements located at index positions in the identified subset include elements from the same trained hypervector class and are all equal to zero or about equal to zero.

7. The method of claim 6, further comprising:

loading the sparsified trained non-binary hyperdimensional machine learning model into a compress-sparse-column circuit.

8. The method of claim 1, wherein the numeric-valued elements located at index positions in the identified subset include elements from a same trained hypervector class and all have an equal or about equal effect on a cosine similarity score with a query hypervector.

9. The method of claim 1, wherein each of the numeric-valued elements is represented by at least two bits of data.

10. The method of claim 1, wherein the numeric-valued elements located at index positions in the identified subset include:

dimension-wise elements that each have a same index within all class hypervectors of the trained non-binary hyperdimensional machine learning model and all have respective values that equal or about equal to one another; and class-wise elements located at different index positions within a same class hypervector and are all equal to zero or about equal to zero.

11. The method of claim 10, wherein the dimension-wise elements and class-wise numeric-valued elements have mutually exclusive indexes within the class hypervectors of the trained non-binary hyperdimensional machine learning model.

12. The method of claim 1, further comprising:

(a) applying training data to the sparsified trained non-binary hyperdimensional machine learning model;

(b) detecting that a query hypervector included in the training data is mis-classified as a first class hypervector included in the sparsified trained non-binary hyperdimensional machine learning model rather than correctly as a second class hypervector included in the sparsified trained non-binary hyperdimensional machine learning model;

(c) subtracting the query hypervector from the first class hypervector and adding the query hypervector to the second class hypervector; and (d) repeating operations (a) through (c) until all training data has been applied to the sparsified trained non-binary hyperdimensional machine learning model to provide an error-corrected sparsified trained non-binary hyperdimensional machine learning model.

13. The method of claim 12, further comprising:

performing the method using the error-corrected sparsified trained non-binary hyperdimensional machine learning model as the trained non-binary hyperdimensional machine learning model.

\* \* \* \* \*